Patented Jan. 16, 1934

1,944,143

UNITED STATES PATENT OFFICE 1,944,143

MOLDABLE COMPOSITION AND ITS PRODUCT

Howard L. Bender, Bloomfield, N. J., assignor to Bakelite Corporation, New York, N. Y., a corporation of Delaware No Drawing. Application February 28, 1929
Serial No. 343,555

1 Claim. (Cl. 154—46)

This invention comprises the application of resinous compositions, including reacting products of formaldehyde or its polymers, or other methylene-containing substances, with phenols and characterized by a light and permanent color, freedom from odor and excellent physical properties, for the manufacture of white or light colored molding compounds, including thereby coated or impregnated sheets of paper or fabric, and of molded and laminated products therefrom. The resinous compositions are specifically claimed in a copending application Ser. No. 147,619 filed November 10, 1926, and granted June 18, 1929, as patent 1,717,600, of which this application is a continuation in part.

If phenol or cresol and formaldehyde be caused to react in approximately equimolecular proportions, alone or in presence of catalysts, resinous products are formed which, however, contain some uncombined phenol or cresol, since the reaction is not strictly quantitative. If the proportion of formaldehyde, or equivalent methylene-containing body such as hexamethylenetetramine, be progressively increased, a point is ultimately reached where free phenol can no longer be detected. For example, by reacting on phenol with about three molecular proportions of formaldehyde, in presence of small proportions of suitable catalysts, resinous products result which are nearly colorless and which do not darken or develop color on exposure to light and air as is the case when free phenol is present even in minute quantity. These resinous products contain, however, residual formaldehyde, presumably largely as paraform, in solid solution in the resin. By binding this residual formaldehyde or equivalent methylene-containing body, or the larger proportion thereof, in the form of a non-phenolic resinous product, I am thereby enabled to obtain at will clear and substantially colorless, homogeneous resinoids, that is, resinous products which are reactive in the sense that by application of sufficient heat they undergo transformation to an infusible and insoluble body. By the absence of both free phenol and free formaldehyde, a substantially odorless as well as colorless product is obtained.

Following are certain specific examples relating to the preparation of these resinoids, it being understood that the examples are illustrative only, and that the particular materials, proportions or manipulations as therein described, do not constitute a restriction of the invention claimed herein.

145 parts by weight of phenol are heated with 412 parts of 40% formaldehyde solution, in presence of 1-5 parts of sodium carbonate or other basic catalyst. Heating is continued until separation of water occurs, and preferably under reduced pressure, until the water is evaporated. During this operation the uncombined formaldehyde, which was originally introduced in large excess of the equimolecular proportions, passes over largely into paraform which dissolves in the rasinous product. Thereupon 40 parts of urea are added, together with sufficient lactic, boric, phosphoric or other acid to establish acid conditions in the mass; and the heating is continued to effect a reaction between the urea and the paraform. When a varnish or lacquer is to be prepared, the addition of alcohol or other solvent may either precede or follow the addition of the urea.

In the above example the amount of urea added may be widely varied say from 20 to 100 parts, preferably avoiding however such excess as would lead to the presence of any substantial amount of uncombined urea in the product. The amount of urea added should not exceed one mol for each two mols of residual paraform or formaldehyde, and is preferably kept distinctly below this proportion, since any excess of urea renders the resinoid less resistant to the action of moisture.

Instead of urea, I may use homologs or derivatives thereof, such as thio-urea; or in general any such urea derivatives as yield with formaldehyde or its equivalents a suitable resinous product.

Instead of urea or its derivatives I may use other resin-forming additions of non-phenolic character, my object being as stated above, to bind the excess methylene in the form of a non-phenolic and light-permanent product. One such addition which has been found satisfactory is paratoluene-sulfonamide, which reacts directly with formaldehyde, paraform or equivalent methylene-containing bodies to yield a resinous product having an excellent plasticizing effect upon the phenol-methylene resinoids.

The present method, and the products prepared thereby, are to be clearly distinguished from mixed resinous products prepared for example by commingling pre-formed phenol-methylene and urea-methylene products; or by reacting with formaldehyde upon mixtures of phenols and urea, etc.; all such products being subject to the objection mentioned above that they contain free phenol, unless prepared with a sufficient excess of formaldehyde or its equivalents so that a considerable excess of uncombined methylenes appear in the product.

Polymers of formaldehyde, and all bodies capable of engendering formaldehyde are to be regarded as equivalent to formaldehyde for the purposes of this invention.

The resinoids prepared as above may be compounded with fillers of any kind at any stage of their manufacture for the preparation of moldable compositions which may be white or of any desired color according to the particular filler and/or pigment chosen. They may also be dissolved in any of the usual varnish or lacquer solvents or solvent mixtures for the preparation of coating or impregnating solutions of any kind and pigments or dyes can be included to give a desired color.

Moldable compositions are obtainable by coating sheet material such as paper, woven fabric, etc., with a varnish, lacquer or enamel and removing the solvents, thus leaving the resinous product in a reactive condition, and these prepared sheets can be pressed between hot platens to produce bonded laminated plates. Or fibrous or granular substances in a finely divided state are added to the resinoid ingredients or to the varnish or mixed with the resinous products in a powdered condition to form molding compounds which can be charged into a hot mold and pressed to conform to the mold.

To illustrate, a white varnish or lacquer is prepared by adding titanium oxide or other suitable white pigment to a solution of the resinoid in alcohol or other suitable solvent or mixture of solvents, and paper in sheet form is immersed or passed through the solution for a period long enough to coat or impregnate the paper to the desired extent, a period of about one-fourth minute being generally sufficient. The treated sheet is then dried at a temperature of about 100 to 120° C. or low enough to avoid entire or substantially entire transformation of the resinoid to the infusible form. Sheets so impregnated or coated are superimposed upon each other to form a pack or used as surface sheets for a pack of sheets treated with other resinoids, and the pack is then submitted to pressures of about 1000 to 2000 pounds to the square inch and a temperature of about 150 to 170° C. (the length of time depending upon the thickness of the pack) until the resinoid binder has fused and set to the infusible condition.

Laminated materials so prepared can be made free from odor since there is no appreciable amount of free phenol and free formaldehyde in the resinoid binder prepared with proper amount of urea, and the color is a decided white tint because of the substantial absence of color inherent in the resinoid. Moreover the permanency of the color under the action of light and air is such that the materials are satisfactory commercially for such uses as the tops of hospital tables, linings and exterior surfaces of refrigerators and other articles of furniture, toilet seats, etc., where the absence of inherent color in the resinoid and permanence of color is demanded. Such materials are peculiarly adapted for refrigerators and other food containers and for which phenolic resinoids have hitherto not been available on account of the presence of free phenol or formaldehyde affecting the odor and taste of foods, though regarded otherwise as highly desirable because of their chemical inertness, antiseptic nature and applicability to commercial operations. Particularly is this freedom from odor associated with molded or laminated products wherein the surfacing material is a resinoid as described in the preceding paragraph; the interior portions or layers can be bonded with the customary forms of resinoids such as the phenolic type having the characteristic phenol odor, and a covering sheet or surfacing layer of the resinoid here described serves to seal the odors so as to prevent migration of odoriferous agents from the interior to the exterior of the product.

In addition to laminated plates it is evident that tubes and other simple shapes can be made from the treated sheet material and that fabrics can be used in place of paper. Colored pigments can be substituted or combined with the white pigments or suitable dyes can be added to the varnish. Likewise pigments, white or colored or mixed, can be added to molding mixtures of a comminuted fibrous or other filler and resinoid to yield white or colored molded products characterized by absence of odor and resinoid color; such molding mixtures are therefore suitable for the molding of cosmetic jars, candy boxes, etc. The term moldable composition as herein used is intended to include both molding mixtures and treated sheet materials.

I claim:

A laminated product in which a surface sheet is impregnated with a resinoid of the phenol-aldehyde type substantially devoid of free phenol and including residual aldehyde largely in the form of a non-phenolic resin, and other sheets forming part of the laminated product are treated with a different resin composition.

HOWARD L. BENDER.